US006237264B1

(12) United States Patent
Gulick, Jr.

(10) Patent No.: US 6,237,264 B1
(45) Date of Patent: *May 29, 2001

(54) DEVICE AND METHOD FOR PRODUCING LENTICULAR IMAGES WITH MOTION

(75) Inventor: Stephen Gulick, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/907,746

(22) Filed: Aug. 8, 1997

Related U.S. Application Data

(63) Continuation of application No. 08/430,076, filed on Apr. 27, 1995, now Pat. No. 5,724,758.

(51) Int. Cl.[7] .......... G03B 25/02
(52) U.S. Cl. .......... 40/454; 359/619
(58) Field of Search .......... 40/427, 454, 453; 359/619, 621, 626, 628

(56) References Cited

U.S. PATENT DOCUMENTS

| | | | | |
|---|---|---|---|---|
| 2,815,310 | * | 12/1957 | Anderson | 154/437 |
| 3,122,853 | * | 3/1964 | Koonz et al. | 359/619 X |
| 3,268,238 | * | 8/1966 | Finkel | 40/427 X |
| 3,538,632 | * | 11/1970 | Anderson | 40/454 X |
| 3,568,346 | * | 3/1971 | Smith | 40/427 |
| 4,959,641 | * | 9/1990 | Bass et al. | 40/454 X |
| 5,359,454 | * | 10/1994 | Steenblik et al. | 359/619 X |
| 5,543,964 | * | 8/1996 | Taylor et al. | 359/463 |
| 5,724,758 | * | 3/1998 | Gulick, Jr. | 40/454 |

* cited by examiner

*Primary Examiner*—Brian K. Green
(74) *Attorney, Agent, or Firm*—William F. Noval

(57) ABSTRACT

A lenticular device comprising:
- a sheet of lenticular material; and
- a printing on a viewing surface of the lenticular material with said printing representing a number of consecutive still images and a number of motion images.

2 Claims, 6 Drawing Sheets

Fig. 1
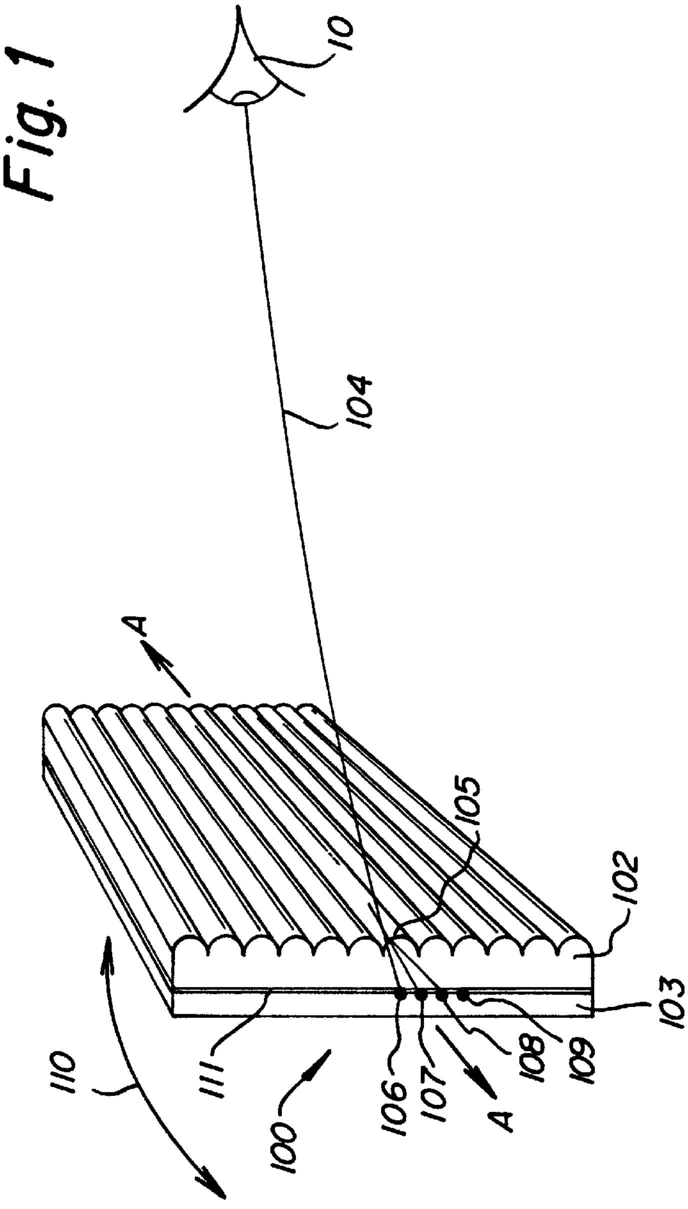
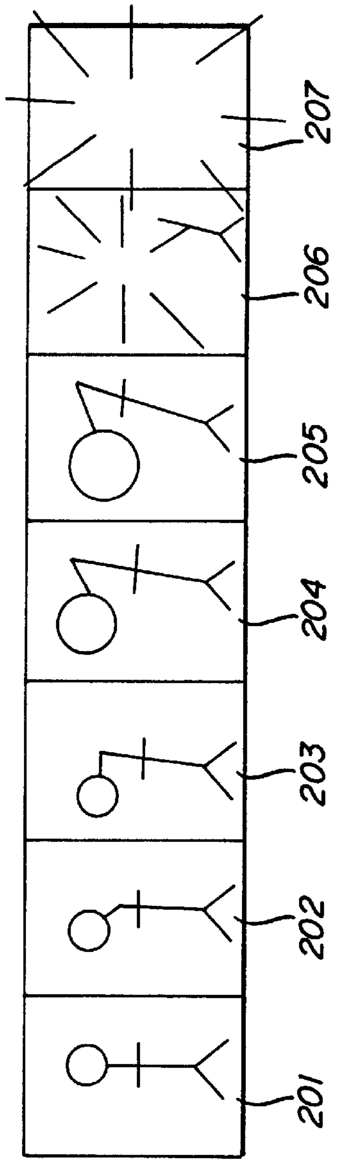
Fig. 2

DEVICE AND METHOD FOR PRODUCING LENTICULAR IMAGES WITH MOTION

This is a Continuation of application Ser. No. 08/430,076, filed Apr. 27, 1995, now U.S. Pat. No. 5,724,758.

FIELD OF INVENTION

The present invention relates to the field of lenticular devices for 3D viewing of images and more particularly to a device and associated method for forming the device such that a portion of the field of view of the device provides the viewer with motion images.

BACKGROUND OF THE INVENTION

Lenticular images can be used to provide the effect of motion, for example, in U.S. Pat. No. 3,268,238, entitled "Publications" by R. Finkel there is disclosed an image page formed with lenticular material that utilizes three views of a rabbit. Each view is slightly different from the other views such that rotation of the page generates a visual impression that one or more features of the rabbit move. In U.S. Pat. No. 3,538,632, entitled "Lenticular Device and Method for Providing Same", by K. Anderson there is disclosed a lenticular display that uses images of a bucking horse and rider. An illusion of motion is imparted to the images by rotating the display. The Anderson invention is specifically directed to the painting of various portions of the images with transparent paint of different colors and shades to enhance the animation or three dimensional effect of the lenticular device.

To successfully provide a lenticular device that displays motion, it is essential that the views of each individual scene be fully extinguished so that the effect of ghosting between adjacent views is minimized as the lenticular device is rotated. It is also necessary to be able to present a sufficient number of views so that there is a sense of continuous motion or so that if the motion is to appear discontinuous there are a number of views to track the total motion to provide the viewer with the sense that the moving objects are in continuous motion, compared to jumping from one location to another.

SUMMARY OF THE INVENTION

The present invention is directed to overcoming one or more of the problems set forth above. Briefly summarized, according to one aspect of the present invention there is provided a lenticular device comprising:

a sheet of lenticular material; and a printing on a viewing surface of the lenticular material with said printing representing a number of consecutive still images and a number of motion images.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantages:

The present invention provides a lenticular device wherein a combination of a non-moving (still) and a motion image are viewable, within a band of viewing angles, so that a viewer may enjoy both the details of the still lenticular device's image and the motion of a motion image without having the bluriness generally associated with moving images.

In addition, compared to the prior art, this invention provides a device and a method for producing combined high-quality still and motion images that are pleasing to the viewer.

Multiple views are used to provide the viewer with a sense of continuous image motion over a substantial viewing range while additionally providing a viewing range of at least one high quality still image.

The provision for either full cycle motion, that is, at an initial viewing angle an object begins to move from a location and continues to move to return to its original location (with or without intermediate stationary images) as the viewing angle is changed or the provision for motion in the object itself (object changes shape) such that the object moves continuously in one direction through a range of motion and then jumps back to its initial shape.

The provision of a lenticular device that can change background viewing color through the range of motion while optionally changing text messages.

The ability to provide a lenticular device which viewably causes an object, through a technique called morphing, to change from one size and/or shape to another size and/or shape.

The provision of a technique for taking video images and translating them into lenticular images to provide a specific viewing sequence, or motion picture film clip.

BRIEF DESCRIPTION OF THE DRAWINGS

FIG. 1 illustrates a lenticular device viewed along a viewing axis;

FIG. 2 illustrates a plurality of image frames for imparting the appearance of motion to a viewer;

DETAILED DESCRIPTION OF THE INVENTION

Figure 3:
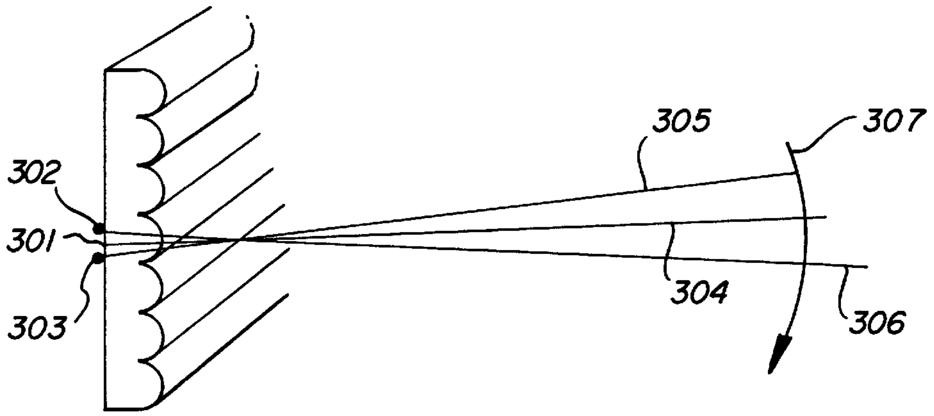
FIG. 3, illustrates a second lenticular device viewed from a number of viewing axes.

Referring to FIG. 1, a lenticular device 100 is constructed from a sheet of lenticular material 102 and an image recording material 103 which is adhered to the back of the lenticular material with an optically transparent adhesive 111. It is also well within the art to print the image directly on the back of the sheet of lenticular material. The recorded or printed image is formed as image slices, wherein each slice represents the view of the image or an object in the image taken from a different viewing angle.

A viewer 101, views through the lenticular material 102 the image slice positioned at a particular viewing angle. For example, the ray 104 passes through a lenticule 105 to perceive a specific viewing image position 106. Consecutive viewing image positions 107, 108 and 109 provide different views (slices) from different angles, thus if the lenticular device 100 is rotated about an axis A—A close to the center of the device and parallel to the lenticular image in a direction shown by arrow 110, then different slices of the image are viewable.

As shown in FIG. 2, these various views involve incremental changes in position, such that the adjacent images, when merged together, appear to simulate motion. For example, the images 201, 202, 203, 204, 205, 206, and 207 illustrate an image sequence wherein a person whose head is getting larger and as the weight of his head causes him to bend over such that his head finally explodes. These multiple views provide the viewer with a sense of continuous motion. Although only a portion of the image (the head and neck) are shown with position and size changes, it is obvious that multiple changes may be likewise incoporated in the sequence of images.

To achieve high quality motion, a number of requirements must be met. These include a high level of extinction between one view and the next. This is shown diagramatically in FIG. 3 where a single on-axis view 301 is illuminated and the adjacent views 302 and 303 are black. If, as we moved incrementally from the central axis position 304 to the on-axis angular position of the next adjacent view at 305, it is necessary that the central axis position 304 become fully extinguished. Thus, if as an observer's eye (or a point intensity measuring instrument) were to move through the arc 307, the intensity of the central bright view would need to be extinguished in accordance with the profile shown in FIG. 4 where position 401 is the on-axis position corresponding to the angular position of central axis position 304 and position 402 corresponds to the view 306 while position 403 corresponds to the arc 307. The profile 404 corresponds to the intensity of the central axis position 304 corresponding to the image created at position 301. Unless the spread of the profile 404 is limited to a few viewing positions and unless this curve diminishes almost to the zero level corresponding to the profile 405, it is not possible to achieve high quality motion in imagery.

One means of obtaining this narrow spread and also a high level of extinction, is to generate the image plane image recording material 103 by exposing it prior to laminating it to the lenticular material 102. Prior art techniques showing motion have tended to expose the image through the lenticular material and this results in the profile of profile 404 being spread out. Other approaches have used printing press methods such as linotype or offset to produce the image recording material 103. However, this provides insufficient resolution to be able to accommodate the more than 20 views (slices) required to provide adequate imaging.

Figure 4:
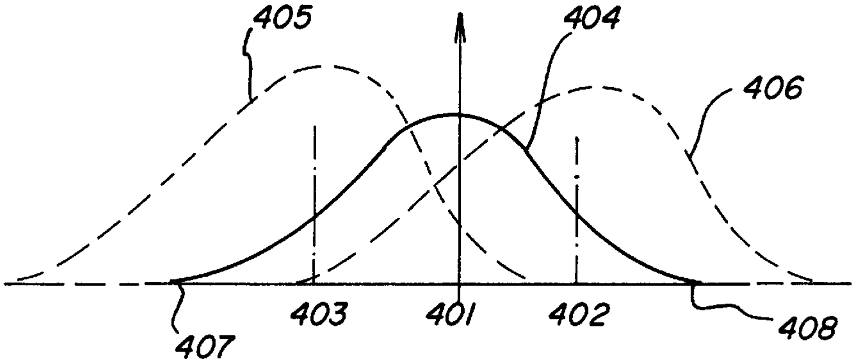
FIG. 4, is a chart illustrating the intensity of a lenticular image viewed at different viewing angles.

In light of these difficulties, the best quality approach is to accurately expose high resolution photographic material which is capable of higher resolution than prior art methods in order to achieve the necessary profile shown in FIG. 4.

Figure 5:
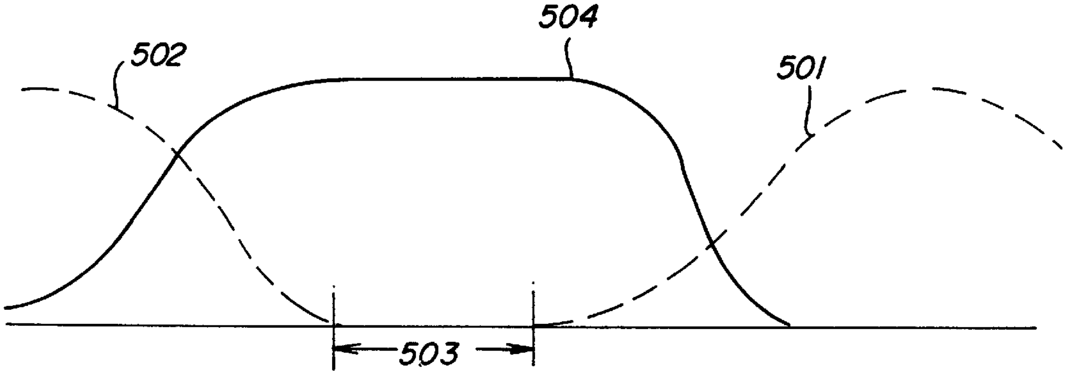
FIG. 5, is a chart illustrating the intensity of a sequence of like still images.
Figure 16:
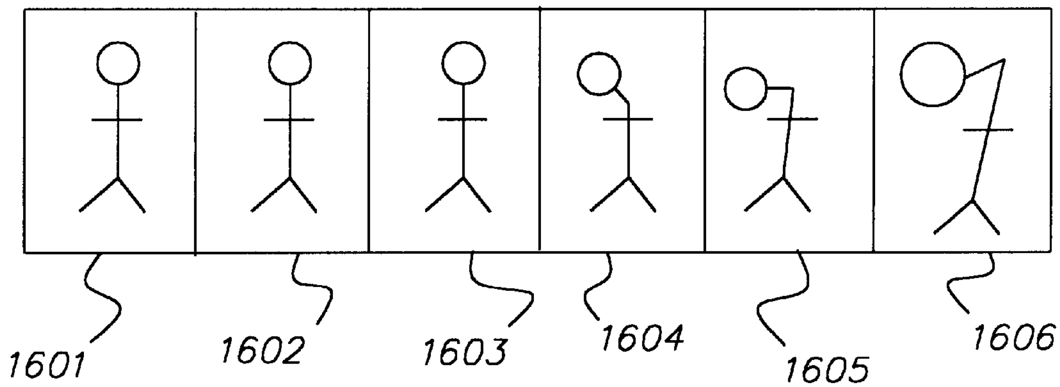
FIG. 16 is a diagrammatic view illustrating the invention.

When combining still images with motion images the still image is created by obtaining a high quality image and positioning that image in a number of consective frames. In the preferred embodiment of the invention it was found that three consective frames provided accetable results with additional frames improving the results. This is shown in FIG. 16 which shows image frames 1601, 1602, 1603 with identical image frames 1604, 1605, 1606 with changing images which when viewed sequentially appear to simulate motion. Referring again to FIG. 4, even given the high quality profile 404 shown, if we were to imagine the shape of the profile of adjoining views corresponding, for example, to profile 405 and profile 406, we would see that there is no position as we move along profile 405 from point 407 to point 408 where the image is contributed to solely by a single view. This occurs because there is no point between points 407 and 408 where only one profile of the profiles 404, 405, 406 is fully on (viewable) and the other profiles are fully off (not viewable) or at a level corresponding to the profile 405. If, on the other hand, as shown in FIG. 5, using the profile characteristic shown in FIG. 4, all three views have the same information, then the net effect would correspond to the profile shown in FIG. 5 and there would be a distance along the profile 405 where adjoining profile 501 on one side and 502 on the other side is fully off while in the range 503 the profile corresponding to the three profiles 504 is the only one that is on, thereby providing a high quality view.

Figure 6:
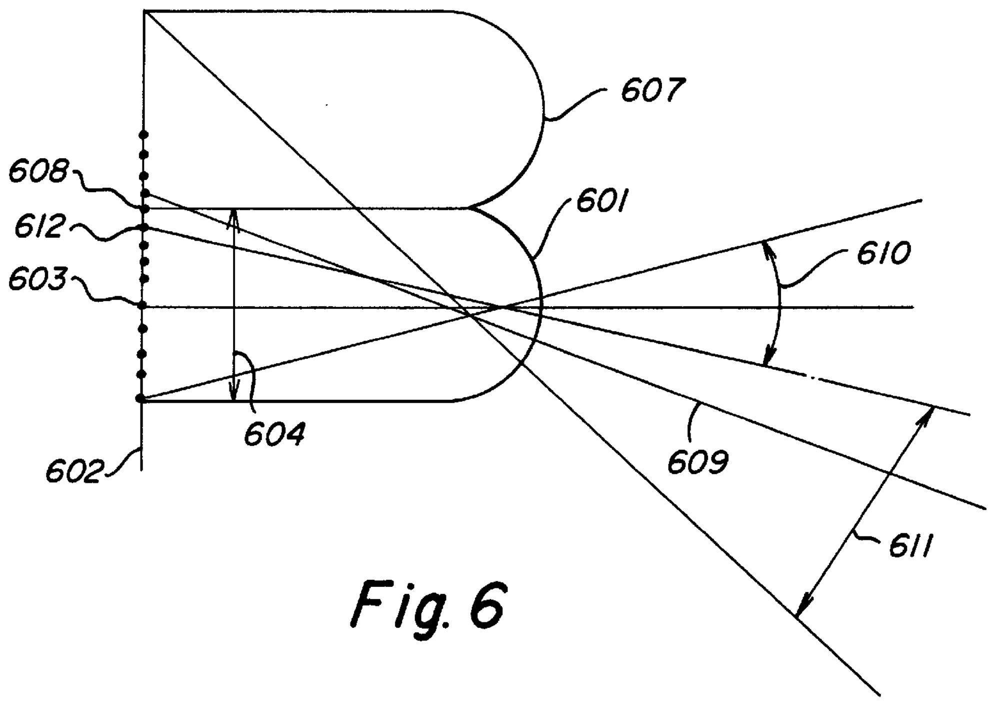
FIG. 6 is an enlarged cross-sectional view of lenticular material, illustrating the visually preceived movement of a portion of an image from an initial position to a fully extended position and back to the original position.
Figure 7:
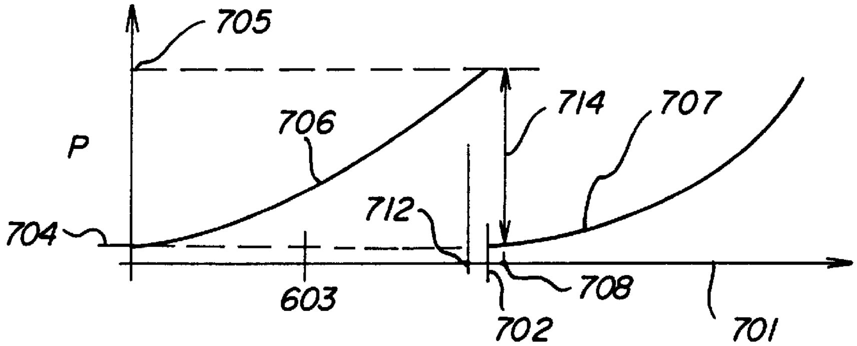
FIG. 7 is a chart illustrating the transition from the end of a sequence of motion images back to the beginning position of the sequence.

Another feature of the present invention is that it provides full cycle motion; that is, in sweeping through the viewing angles one or more cycles of motion for an object will be viewable. This effect is illustrated in FIG. 6. Consider a single lenticule 601 with a central view on an image plane 602 at position 603. This central view will be on axis. Behind lenticule 601 within the range designated as 604 a number of views may reside corresponding to different positions. Typically, this number will be 20 or greater. Other views can be found to lie behind lenticule 607 and position 608 may be the first such view behind lenticule 607. However, in the viewing angle shown by line 609 position 608 may be seen through lenticule 601 rather than the lenticule 607 which is directly in front of it. The limit of angle which can be viewed and still see views directly behind a designated lenticule is defined as the primary viewing angle shown as 610. There is, however, a secondary viewing angle, designated as 611, corresponding to views all of which lie behind lenticule 607. Thus, the switch between the first position 608 behind lenticule 607 and the last position 612 behind lenticule 601 can be abrupt if position 612 corresponds to the end of a continuous motion sequence which is moving in one direction. This technique is further shown in FIG. 7 where for different views starting with position 603 the position P of a given element of a scene along an axis 701, which corresponds to consecutive views is plotted. The break between lenticule 601 and 607 corresponds to the position 702 on axis 701. And the positions 608 and 612 are designated by points 708 and 712. Consider now some continuous motion which is moving from position 704 to position 705. This motion is shown diagramatically by profile 706 and this motion will be repeated by views behind lenticule 607, as indicated by identical profile 707. Consequently, there is a rapid change from position 705 corresponding to position 612 along axis 701 at point 712, to the position 704 corresponding to position 608 designated by the intersection of the vertical line from point 708 on axis 701 with the profile 707. The magnitude of this positional change is indicated by the line 714.

Figure 8:
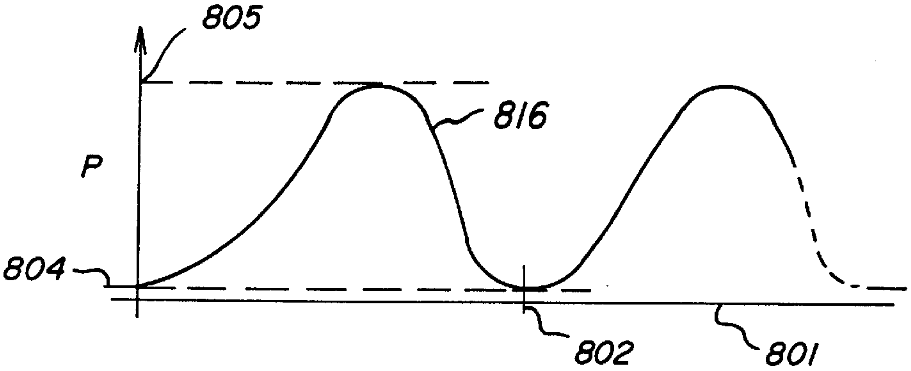
FIG. 8 is a chart illustrating the cyclic representation of the movement of the image of FIG. 7.

In this particular case, the viewer will see an abrupt change in motion. Alternatively, as shown in FIG. 8, motion can be laid out along a cycle without a substantial break. This is shown by profile 816 which also swings over a similar position range from position 804 to position 805. However, in this case the point between positions 612 and 608 designated by point 802 results in no significant change in position.

Figure 9:
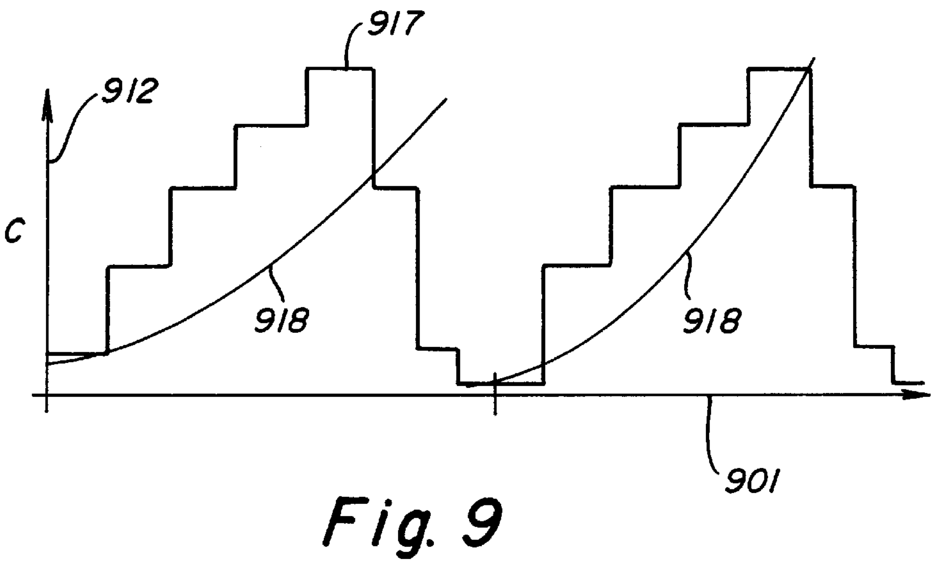
FIG. 9 is a chart illustrating a change in the background color of an image.

Another feature of the present invention is the ability to change the background color through a range of motion. It will also be appreciated that it is possible to change intensity, hue, saturation, or any other image intensity variable from one view to the next. This is shown diagramatically in FIG. 9 where color is indicated on the vertical axis 912 and the horizontal axis 901 again corresponds to the angular position of specific views. In this case, color may be changed with steps per view, as shown in profile 917, or may change continuously, as shown in profile 918. This change in color can be accompanied with changes in position and other affects.

Figure 10:
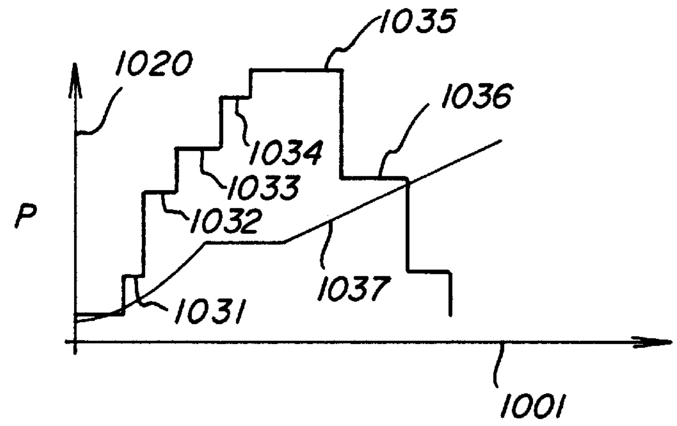
FIG. 10 is a chart illustrating different motion changes in a plurality of images.

FIG. 10 shows other alternative paths for motion as designated by vertical position axis 1020 where sudden motions may take place between consecutive views for some range of the image, for example positions 1031, 1032, 1033 and 1034. On the other hand, mid-motion stationary views may be seen as designated by position 1035 and 1036. Alternatively, a combination of smooth and stationary motion may be used to as shown by profile 1037.

Figure 11:
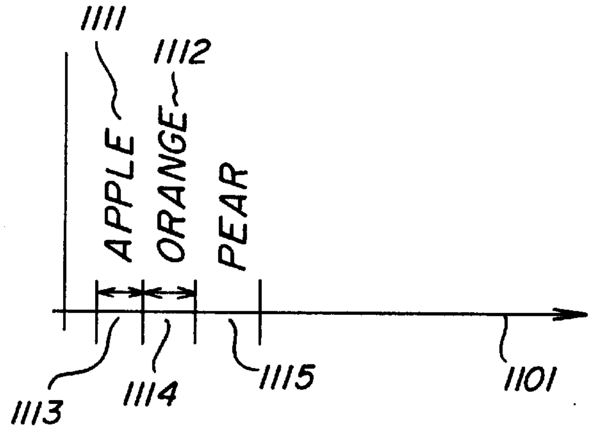
FIG. 11 illustrates in graph form the change in text as the lenticular device is rotated.
Figure 12:
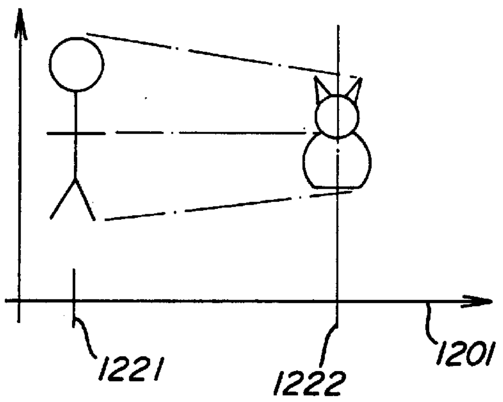
FIG. 12 illustrates a morphing embodiment wherein the motion is one of the image of a man changing smoothly into the image of a cat.

Text messages may also be changed through a range of motion. This is shown diagramatically in FIG. 11 where axis 1101 corresponds to the angular position and the text, for example, the word apple in position 1111, may be replaced with the word orange at position 1112. The apple text will fall in positional angular range 1113 while the orange text will fall in positional angular range 1114. Similarly, the pear text falls in range 1115. The switch between these words may be gradual as intensity is changed, may be sudden or may be morphed, or some other fade-in/fade-out effect. These changes in text may correspond in changes in views; for example, range 1113 may indeed contain an apple, range 1114 may indeed contain an orange, and range 1115 may contain a pair of pears. It is also possible to use other transition techniques between views; for example, as shown in FIG. 12 where axis 1201 corresponds to angular position of the viewer. The position 1221 may correspond to the view of a man and the position 1222 may correspond to the position of a cat, and there may be a gradual transition of views between these positions.

Figure 13:
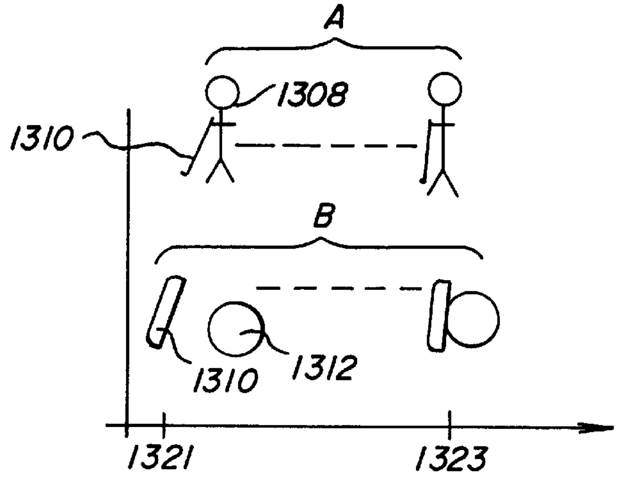
FIG. 13 illustrates an image sequence wherein the main moving object of the image shares viewing space with at least one other moving object in at least one frame of the lenticular device.

In another embodiment of the invention two picture sequences A and B are arranged in the same image with each picture having a motion that is complimentary to the overall scene. Thus, for example, in FIG. 13 position 1321 may contain the view of a golf club head 1310 one foot away from a golf ball 1312 while position 1323 may contain a view of the golf club head 1310 hitting the ball 1312 and simultaneously shown in the same scene is a view of the golfer 1308 at position 1321, when his golf club head is one foot away from the ball and the view of the golfer when his golf club head hits the ball is shown in position 1323. Intermediate positions would be shown in the views between angular positions 1321 and 1323.

Figure 14:
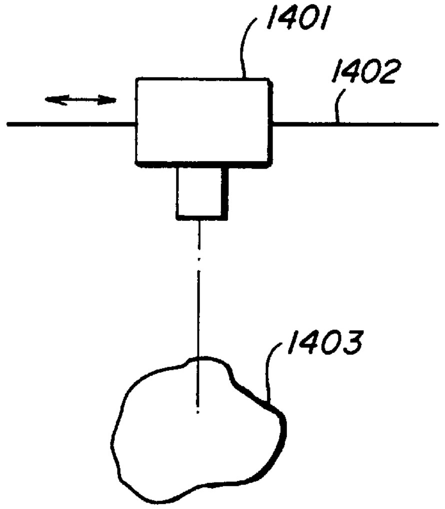
FIG. 14 illustrats a system for capturing the images that will provide the illusion of motion.

The method of generating various viewing effects is shown in FIG. 14. The various images are created by having camera 1401 move along track 1402 to provide a sense of motion with respect to object 1403. Alternatively, the object 1403 may be moved with respect to the camera 1401. Another way to generate images is by using a computer graphics workstation under operator control to generate a sequence of views digitially. One perferred system for capturing film source material is the Photo CD workstation (PIW) offered by KODAK. The digitized images provided by the workstation are rescaled into horizontal lines whose number and pitch are matched to the lenticular material through which the image is to be viewed. Each of these views are then grouped together in a series so that the horizontal line segments of each view are adjacent to For proofing the sequence of images are sequentially viewed on a computer work station monitor at a fast enough rate to instill the sense of motion for verifying that the desired amount of motion is being generated by the sequence.

Another feature of the invention is its ability to take video images from tape or film and to translate them into lenticular images to provide a specific viewing sequence or clip. The images from the tape are obtained via a digital frame converter while the images from film are obtained from the PIW.

Figure 15:
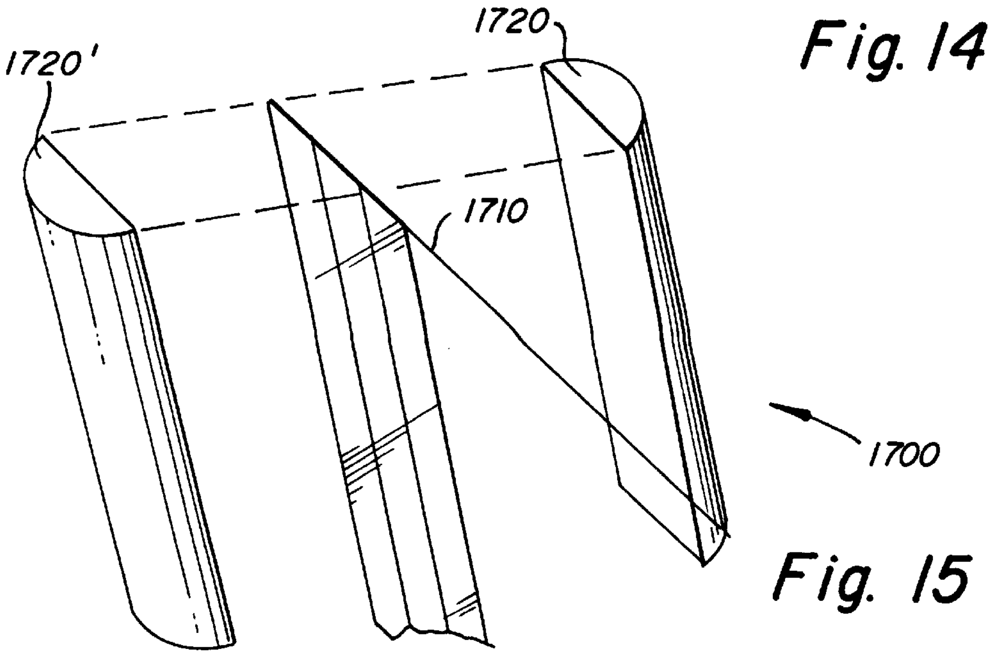
FIG. 15 illustrates a lenticular device having a front and a rear lenticular viewing surface.

Referring to FIG. 15, a lenticular device 1700 is shown comprised of a recording medium 1710. The medium has recorded thereon slices of images representing a respective range of viewing angles, for example, the medium has recorded thereon the views of an object. In this particular case this only works when the recording medium is a transmissive media the lenticular sheets 1720 and 1720' are positioned so as to sandwich the recording medium 1710. The image that is chosen for this process is one that makes visual sense for viewing from the front and with a mirror image viewed from the back.

Once the sequence of images is defined the set of digital data representing these images needs to be fromed through a process that will enable the lenticular material to be applied to an output media to form the final product (device). The first step is to take the images and separate them into subsets of data that fit behind one lenticule. One lenticule represents the same line number taken from each image in the sequence. To have proper viewing of the final product because of the way the lens works the actual order of the picuters under the lenticule is reversed. Multiple groups of these lenticules are combined to define the size of the finished lenticular device. At one particular viewing angle a full image from the sequence is visible by viewing through the lenticular surface the representation of the digital data. The process to create the media that is used under the lenticular material is to output the above described digital data combinations to a digital film recorder which produces a negative. The negative is then contact printed on an output media. This output media is then laminated to the lenticular material.

The invention has been described with reference to a preferred embodiment. However, it will be appreciated that variations and modifications can be effected by a person of ordinary skill in the art without departing from the scope of the invention.

| Parts List: | |
|---|---|
| 100 | Lenticular device |
| 101 | Viewer |
| 102 | Lenticular material |
| 103 | Recording material |
| 104 | Ray |
| 105 | Lenticule |
| 106 | Viewing image position |
| 107 | Viewing image position |
| 108 | Viewing image position |
| 109 | Viewing image position |
| 110 | Arrow |
| 111 | Transparent adhesive |
| 201 | Image |
| 202 | Image |
| 203 | Image |
| 204 | Image |
| 205 | Image |
| 206 | Image |
| 207 | Inage |
| 301 | On-axis view |
| 302 | View |
| 303 | View |
| 304 | Central axis position |
| 305 | View |
| 306 | View |
| 307 | Arc |
| 401 | Position |
| 402 | Position |
| 403 | Position |
| 404 | Profile |
| 405 | Profile |
| 406 | Profile |
| 407 | Point |
| 408 | Point |
| 501 | Profile |
| 502 | Profile |
| 503 | Range |
| 504 | Profile |
| 601 | Lenticule |
| 602 | Image plane |
| 603 | Position |
| 604 | Range |
| 607 | Lenticule |
| 608 | Position |
| 609 | Line |
| 610 | Viewing angle |
| 611 | Viewing angle |
| 612 | Position |
| 701 | Axis |
| 702 | Position |
| 704 | Position |
| 705 | Position |
| 706 | Profile |
| 707 | Profile |
| 708 | Point |
| 712 | Point |
| 714 | Line |
| 802 | Point |
| 804 | Position |
| 805 | Position |
| 816 | Profile |
| 901 | Horizontal axis |
| 912 | Vertical axis |
| 917 | Profile |
| 918 | Profile |

-continued

| Parts List: | |
|---|---|
| 1020 | Vertical position axis |
| 1031 | Position |
| 1032 | Position |
| 1033 | Position |
| 1034 | Position |
| 1035 | Position |
| 1036 | Position |
| 1037 | Profile |
| 1101 | Axis |
| 1111 | Position |
| 1112 | Position |
| 1113 | Range |
| 1114 | Range |
| 1115 | Range |
| 1201 | Axis |
| 1221 | Position |
| 1222 | Position |
| 1301 | |
| 1308 | Golfer |
| 1310 | Golf club head |
| 1312 | Golf ball |
| 1321 | Position |
| 1323 | Position |
| 1401 | Camera |
| 1402 | Track |
| 1403 | Object |
| 1700 | Lenticular device |
| 1710 | Recording medium |
| 1720 | Lenticular sheet |
| 1720' | Lenticular sheet |
| A—A | Axis |

What is claimed is:

1. A lenticular device comprising;

a lenticular element having a plurality of lenticular lenses; and an image assembly on a surface of said lenticular element viewable through said plurality of lenticular lenses, said image assembly including a first set of consecutive image frames which can be viewed over a first viewing range, wherein each of said image frames includes an image which is completely identical to the image of each other image frame in said first set and including a second set of consecutive image frames adjacent to but separate from said first set of image frames, said second set of image frames can be viewed over a second viewing range adjacent to but not including said first viewing range, wherein each said second set of image frames have different from one another images which when viewed sequentially appear to simulate motion.

2. The lenticular device of claim 1 wherein text images are combined with one or more of said first and said second sets of image frames.

* * * * *